United States Patent
Wu et al.

(10) Patent No.: US 11,698,541 B2
(45) Date of Patent: Jul. 11, 2023

(54) OPTICAL LENS DEVICE WITH CHROMA ENHANCEMENT

(71) Applicant: Foresight Optical Ltd., Tainan (TW)

(72) Inventors: Tien-Shu Wu, Tainan (TW); Yen-Ting Wu, Tainan (TW)

(73) Assignee: FORESIGHT OPTICAL LTD., Tainan (TW)

( * ) Notice: Subject to any disclaimer, the term of this patent is extended or adjusted under 35 U.S.C. 154(b) by 136 days.

(21) Appl. No.: 16/875,015

(22) Filed: May 15, 2020

(65) Prior Publication Data

US 2021/0240011 A1 Aug. 5, 2021

(30) Foreign Application Priority Data

Feb. 5, 2020 (TW) .................................. 109103590

(51) Int. Cl.
*G02C 7/10* (2006.01)
(52) U.S. Cl.
CPC ...................................... *G02C 7/10* (2013.01)
(58) Field of Classification Search
CPC ................................ G02C 7/10; G02C 7/104
USPC ....................... 351/41, 159.01, 159.6, 159.63
See application file for complete search history.

(56) References Cited

U.S. PATENT DOCUMENTS

| | | | |
|---|---|---|---|
| 8,770,749 B2 | 7/2014 | McCabe et al. | |
| 9,134,547 B2 | 9/2015 | McCabe et al. | |
| 9,383,594 B2 | 7/2016 | McCabe et al. | |
| 9,575,335 B1 | 2/2017 | McCabe et al. | |
| 9,910,297 B1 | 3/2018 | McCabe et al. | |
| 10,345,623 B2 | 7/2019 | McCabe et al. | |
| 10,401,652 B2 | 9/2019 | McCabe et al. | |
| 11,112,622 B2 * | 9/2021 | Coppa .............. | B29D 11/00413 |

\* cited by examiner

*Primary Examiner* — Tuyen Tra
(74) *Attorney, Agent, or Firm* — Che-Yang Chen; Law Office of Michael Chen

(57) ABSTRACT

An optical lens device includes a lens body, an optical filter and an optical absorbance portion. The lens body has a first lens surface and a second lens surface between which to form the optical filter where is to provide the optical absorbance portion. The optical absorbance portion includes a first main absorbance area having a first absorbance peak portion and a second main absorbance area having a second absorbance peak portion. The first main absorbance area has a first wavelength range between 420 nm and 440 nm formed as a high-energy blue UV absorbance area while the second main absorbance area has a second wavelength range between 580 nm and 610 nm.

20 Claims, 5 Drawing Sheets

OPTICAL LENS DEVICE WITH CHROMA ENHANCEMENT

BACKGROUND OF THE INVENTION

1. Field of the Invention

The present invention relates to an optical lens device with chroma enhancement. Particularly, the present invention relates to the optical lens device with chroma enhancement for eyewear or wearable eye protection. More particularly, the present invention relates to the optical lens device with chroma enhancement having various absorbable characteristics of multi-wavelength peaks, high wavelength peaks, high wavelength peak values or high wavelength peak ranges.

2. Description of the Related Art

U.S. Pat. No. 9,134,547, entitled "EYEWARE WITH CHROMA ENHANCEMENT," discloses eyeware including a lens body and an optical filter configured to attenuate visible light in certain spectral bands. The optical filter has a spectral profile including a plurality of absorptance peaks. Each of the absorptance peaks has a maximum absorptance, a center wavelength and an absorptance peak location. The absorptance peaks include a blue absorbance peak having a spectral range between 445 nm and 480 nm or 445 nm and 485 nm, a yellow absorbance peak having a spectral range between 540 nm and 600 nm or 572 nm and 576 nm and a red absorbance peak having a spectral range between 610 nm and 660 nm.

Further, U.S. Pat. No. 9,383,594, entitled "EYEWARE WITH CHROMA ENHANCEMENT," discloses eyeware including a lens body and an optical filter configured to attenuate visible light in certain spectral bands. The lens body has a gray appearance having a first filtered portion of visible spectrum comprising a spectral range of about 440 nm to about 510 nm, a second filtered portion of visible spectrum comprising a spectral range of about 540 nm to about 600 nm, and a third filtered portion of visible spectrum comprising a spectral range of about 630 nm to about 660 nm.

Further, U.S. Pat. No. 9,575,335, entitled "EYEWARE WITH CHROMA ENHANCEMENT FOR SPECIFIC ACTIVITIES," discloses eyeware including a lens body and an optical filter configured to attenuate visible light in a first spectral band and a second spectral band. The first spectral band comprises a first absorbance peak having a first center wavelength in a wavelength range between about 450 nm and about 490 nm, or about 440 nm and about 510 nm. The second spectral band comprises a second absorbance peak having a second center wavelength in a wavelength range between about 550 nm and about 590 nm, about 555 nm and about 580 nm, or about 550 nm and about 570 nm.

Further, U.S. Pat. No. 9,910,297, entitled "EYEWARE WITH CHROMA ENHANCEMENT," discloses eyeware including a lens body and an optical filter configured to attenuate visible light in a first spectral band and a second spectral band. The first spectral band comprises a first absorbance peak between about 440 nm and about 510 nm and a first maximum absorptance between about 440 nm and about 510 nm. The second spectral band comprises a second absorbance peak between about 550 nm and about 590 nm and a second maximum absorptance between about 540 nm and about 600 nm.

Further, U.S. Pat. No. 8,770,749, entitled "EYEWARE WITH CHROMA ENHANCEMENT," discloses eyeware including a lens body and an optical filter configured to attenuate visible light in a plurality of spectral bands. Each of spectral bands includes an absorptance peak with a spectral bandwidth, a maximum absorptance and an integrated absorptance peak area within the spectral bandwidth. The optical filter comprises a blue light absorptance peak with a center wavelength between about 445 nm and about 480 nm and a yellow light absorptance peak with a center wavelength between about 540 nm and about 580 nm. A first optical filter comprises a first spectral band between about 440 nm and about 480 nm and a second optical filter comprises a second spectral band between about 630 nm and about 660 nm.

Further, U.S. Pat. No. 10,401,652, entitled "EYEWARE WITH CHROMA ENHANCEMENT," discloses eyeware including a lens body and an optical filter configured to attenuate visible light in a plurality of spectral bands. A first optical filter comprises a first spectral band between about 440 nm and about 480 nm, a second optical filter comprises a second spectral band between about 540 nm and about 600 nm and a third optical filter comprises a third spectral band between about 630 nm and about 660 nm. The optical filter comprises a blue light absorptance peak with a center wavelength between about 440 nm and about 510 nm, a yellow light absorptance peak with a center wavelength between about 540 nm and about 600 nm and a red light absorptance peak with a center wavelength between about 610 nm and about 660 nm.

Further, U.S. Pat. No. 10,345,623, entitled "EYEWARE WITH CHROMA ENHANCEMENT," discloses eyeware including a lens body and an optical filter configured to attenuate visible light in certain spectral bands. Each of spectral bands includes an absorptance peak with a spectral bandwidth, a maximum absorptance and an integrated absorptance peak area within the spectral bandwidth. The optical filter comprises a first absorptance peak, a second absorptance peak and a third absorptance peak. A first maximum absorptance of the first absorptance peak is However, there is a need of improving the conventional eyeware devices for enhancing color vision and spatial visibility and further increasing eye comfortability and eye protection. The above-mentioned patent application publications are incorporated herein by reference for purposes including, but not limited to, indicating the background of the present invention and illustrating the situation of the art.

SUMMARY OF THE INVENTION

The primary objective of this invention is to provide an optical lens device with chroma enhancement. The optical lens device includes a lens body and an optical filter provided therein. The lens body has an optical absorbance portion, including a first main absorbance area having a first absorbance peak portion and a second main absorbance area having a second absorbance peak portion. The first main absorbance area has a first wavelength range between 420 nm and 440 nm as a high-energy blue UV absorbance area while the second main absorbance area has a second wavelength range between 580 nm and 610 nm. Advantageously, the optical lens device of the present invention is successful in enhancing color vision and spatial visibility and further increasing eye comfortability and eye protection.

The optical lens device in accordance with an aspect of the present invention includes:

a lens body having a first lens surface and a second lens surface, with the first lens surface provided at a first side of the lens body, with the second lens surface provided at a second side of the lens body;

an optical filter provided between the first side and the second side of the lens body; and an optical absorbance portion provided in the optical filter, with the optical absorbance portion having a first main absorbance area with a first absorbance peak portion and a second main absorbance area with a second absorbance peak portion;

wherein the first main absorbance area has a first wavelength range between 420 nm and 440 nm formed as a high-energy blue UV absorbance area while the second main absorbance area has a second wavelength range between 580 nm and 610 nm.

The optical lens device in accordance with another aspect of the present invention includes:

a lens body having a first lens surface and a second lens surface, with the first lens surface provided at a first side of the lens body, with the second lens surface provided at a second side of the lens body;

an optical filter provided between the first side and the second side of the lens body; and an optical absorbance portion provided in the optical filter, with the optical absorbance portion having a first main absorbance area with a first absorbance peak portion and a second main absorbance area with a second absorbance peak portion;

wherein the first absorbance peak portion has a first wavelength ranging between 420 nm and 440 nm, with the first main absorbance area formed as a high-energy blue UV absorbance area while the second main absorbance area has a second wavelength range between 580 nm and 610 nm.

The optical lens device in accordance with another aspect of the present invention includes:

a lens body having a first lens surface and a second lens surface, with the first lens surface provided at a first side of the lens body, with the second lens surface provided at a second side of the lens body;

an optical filter provided between the first side and the second side of the lens body; and an optical absorbance portion provided in the optical filter, with the optical absorbance portion having a first main absorbance area with a first absorbance peak portion and a second main absorbance area with a second absorbance peak portion;

wherein the first main absorbance area has a first wavelength range between 420 nm and 440 nm formed as a high-energy blue UV absorbance area while the second absorbance peak portion has a second wavelength ranging between 580 nm and 610 nm.

In a separate aspect of the present invention, the first absorbance peak portion has a spectral range with a first absorbance above 80% or 95%.

In a further separate aspect of the present invention, the first main absorbance area has a first maximum absorbance with a wavelength about 432 nm.

In yet a further separate aspect of the present invention, the second absorbance peak portion has a spectral range with a second absorbance above 50%, 60%, 70% or 80%.

In yet a further separate aspect of the present invention, the second main absorbance area has a second maximum absorbance with a wavelength about 595 nm.

In yet a further separate aspect of the present invention, the first absorbance peak portion has the first wavelength range between 425 nm and 435 nm.

In yet a further separate aspect of the present invention, the second absorbance peak portion has the second wavelength range between 590 nm and 605 nm or between 590 nm and 600 nm.

In yet a further separate aspect of the present invention, the optical filter has at least one filter layer formed as a high-energy blue UV absorbance layer (or area) and at least one filter layer formed as a yellow-light absorbance layer (or area).

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that an optical lens device with chroma enhancement in accordance with the preferred embodiment of the present invention can be applicable to various glasses (including rimless glasses), various sunglasses, various smart glasses, various sport glasses (including motorcycle-riding glasses), various goggles, various VR wearable glasses devices, various AR wearable glasses devices or other optical devices such as computer display glasses or TV screen glasses, which are not limitative of the present invention.

Figure 1:
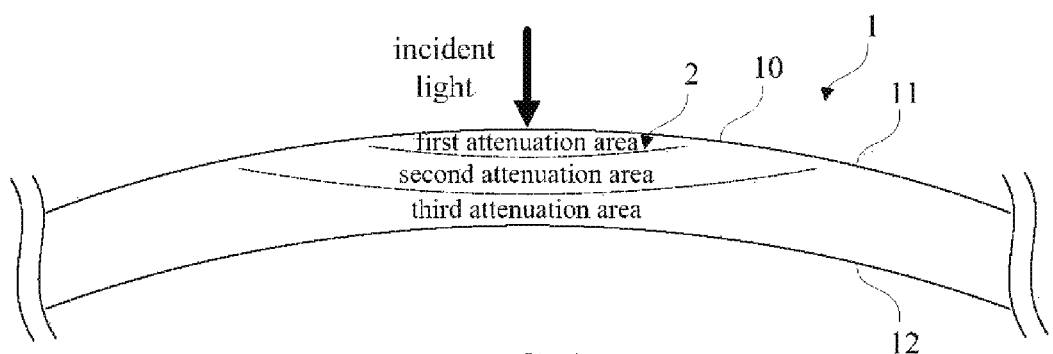
FIG. 1 is a schematic side view of an optical lens device with chroma enhancement in accordance with a first preferred embodiment of the present invention.

FIG. 1 shows a schematic side view of an optical lens device with chroma enhancement in accordance with a first preferred embodiment of the present invention. Referring now to FIG. 1, the optical lens device with chroma enhancement in accordance with the first preferred embodiment of the present invention includes a first lens body 1, an optical filter 10 and an optical absorbance portion 2.

With continued reference to FIG. 1, by way of example, the first lens body 1 is formed from a curved-surface lens body such as a corrective glasses, a sunglasses, a sport glasses, a reading glasses, a helmet face shield, a safety helmet face shield (including welding helmet face shield), or other curved-surface lens bodies. The first lens body 1 is a transparent lens body with a preferred curvature.

Still referring to FIG. 1, by way of example, the first lens body 1 has a first lens surface 11 located at a first side (i.e. outer side as a light incident side) and a second lens surface 12 located at a second side (i.e. inner side as a light filtered side). The first lens body 1 is serially formed with a first light-attenuation layer (or area) with at least one first predetermined absorbance peak, a second light-attenuation layer (or area) with at least one second predetermined absorbance peak and a third light-attenuation layer (or area) with at least one third predetermined absorbance peak.

Figure 2:
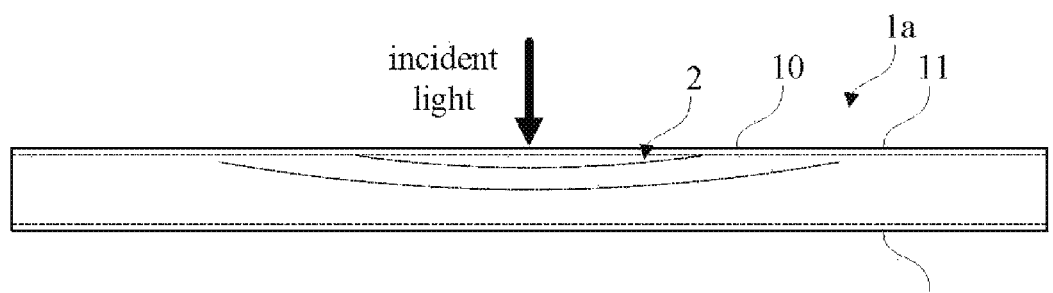
FIG. 2 is a schematic side view of an optical lens device with chroma enhancement in accordance with a second preferred embodiment of the present invention.

FIG. 2 shows a schematic side view of an optical lens device with chroma enhancement in accordance with a second preferred embodiment of the present invention, corresponding to that shown in FIG. 1. Turning now to FIG. 2, in comparison with the first embodiment, the optical lens device with chroma enhancement in accordance with the second preferred embodiment of the present invention includes a second lens body 1a, an optical filter 10 and an optical absorbance portion 2.

With continued reference to FIG. 2, by way of example, the second lens body 1a is formed from a flat-surface lens body, a thin layer lens body or a multiple layer lens body such as a TV screen glasses, a screen protector for 3C electronic devices, or other flat-surface lens bodies.

Referring back to FIGS. 1 and 2, by way of example, the optical filter 10 is suitably provided between the first lens surface 11 and the second lens surface 12 of the first lens body 1 or the second lens body 1a. Accordingly, the optical filter 10 is capable of attenuating incident light from the first lens surface 11 to the second lens surface 12, as best shown by arrows in FIGS. 1 and 2.

Still referring to FIGS. 1 and 2, by way of example, the optical absorbance portion 2 is suitably provided at a preferred position of the optical filter 10. In a preferred embodiment, the optical absorbance portion 2 may be at the first lens surface 11 or the second lens surface 12. The optical absorbance portion 2 includes a plurality of main absorbance areas and is made from at least one dye powder material which is selected from FOB-002 manufactured by Yamada Chemical Co. Ltd., Japan (region $\lambda_{Max}$=432 nm), FOG-007 manufactured by Yamada Chemical Co. Ltd., Japan (region $\lambda_{Max}$=595 nm) or a mixture thereof.

With continued reference to FIGS. 1 and 2, by way of example, the optical absorbance portion 2 has a plurality of main absorbance areas to filter incident light, as best shown by arrows in FIGS. 1 and 2, to form a filtered spectrum band. Furthermore, the optical absorbance portion 2 is formed from a plurality of attenuation areas, as best shown by curved dotted lines in FIGS. 1 and 2, which are selectively made from different concentrations of dye powder materials.

Figure 3:
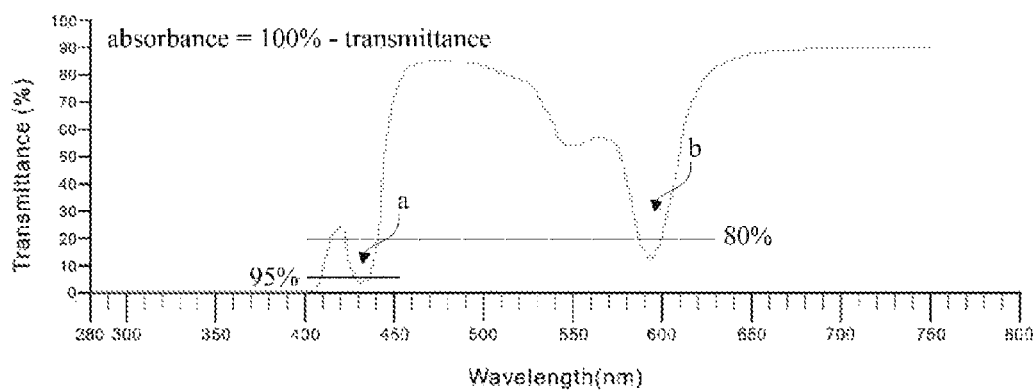
FIG. 3 is a chart illustrating a first filtered spectral band of the optical lens device in accordance with a preferred embodiment of the present invention.

FIG. 3 shows a chart illustrating a first filtered spectral band of the optical lens device in accordance with a preferred embodiment of the present invention. Turning now to FIGS. 1, 2 and 3, by way of example, the optical absorbance portion 2 of the first filtered spectral band has a first main absorbance area "a", as best shown at left side in FIG. 3, and a second main absorbance area "b", as best shown at right side in FIG. 3, which are made from a first preferred concentration of FOB-002 and a second preferred concentration of FOB-007. In a preferred embodiment, the first preferred concentration of FOB-002 is between about 0.005 $^g/_{kg\ PC}$ and about 0.02 $^g/_{kg\ PC}$ or is about 0.015 $^g/_{kg\ PC}$ for a first peak (e.g. $\lambda_{Max}$=432 nm) while the second preferred concentration of FOG-007 is between about 0.005 $^g/_{kg\ PC}$ and about 0.04 $^g/_{kg\ PC}$ or is about 0.03 $^g/_{kg\ PC}$ for a second peak (e.g. $\lambda_{Max}$=595 nm).

With continued reference to FIGS. 1, 2 and 3, by way of example, the first main absorbance area "a" has a first absorbance peak portion and the second main absorbance area "b" has a second absorbance peak portion. Furthermore, the first main absorbance area "a" has a first wavelength range between 420 nm and 440 nm formed as a high-energy blue UV absorbance area while the second main absorbance area "b" has a second wavelength range between 580 nm and 610 nm.

Referring again to FIG. 3, in another preferred embodiment, the first main absorbance area "a" has a first wavelength range between 420 nm and 440 nm while the second absorbance peak portion of the second main absorbance area "b" has a second wavelength ranging between 580 nm and 610 nm.

With continued reference to FIG. 3, in another preferred embodiment, the first absorbance peak portion of the first main absorbance area "a" has a first wavelength ranging between 420 nm and 440 nm, or between 425 nm and 435 nm while the second main absorbance area "b" has a second wavelength range between 580 nm and 610 nm, between 590 nm and 605 nm, or between 590 inn and 600 nm.

With continued reference to FIG. 3, by way of example, the first absorbance peak portion of the first main absorbance area "a" has a first absorbance above 95% and the second absorbance peak portion of the second main absorbance area "b" has a second absorbance above 80% or 85%. A predetermined ratio of first absorbance to second absorbance is 95:80, 95:85 or other suitable value, as best shown in FIGS. 3-14.

Figure 4:
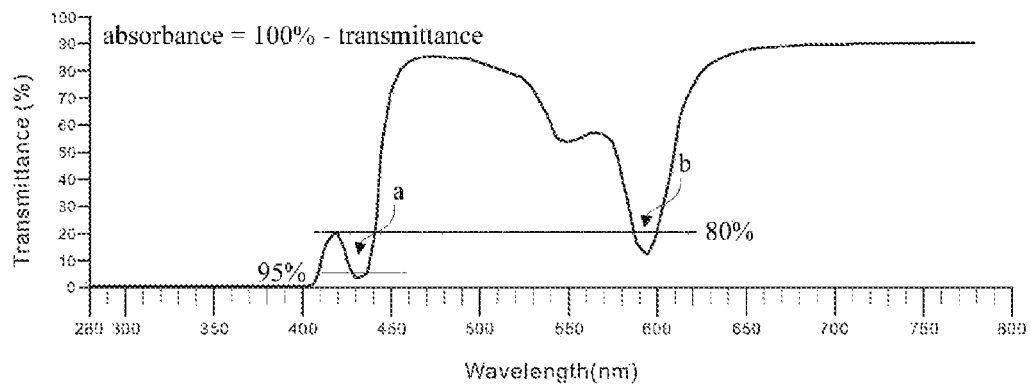
FIG. 4 is a chart illustrating a second filtered spectral band of the optical lens device in accordance with another preferred embodiment of the present invention.

FIG. 4 shows a chart illustrating a second filtered spectral band of the optical lens device in accordance with another preferred embodiment of the present invention. Turning now to FIGS. 1, 2 and 4, by way of example, the optical absorbance portion 2 of the second filtered spectral band has a first main absorbance area "a", as best shown at left side in FIG. 4, and a second main absorbance area "b", as best shown at right side in FIG. 4. Furthermore, the first absorbance peak portion of the first main absorbance area "a" has a first absorbance above 95% and the second absorbance peak portion of the second main absorbance area "b" has a second absorbance above 80%.

Figure 5:
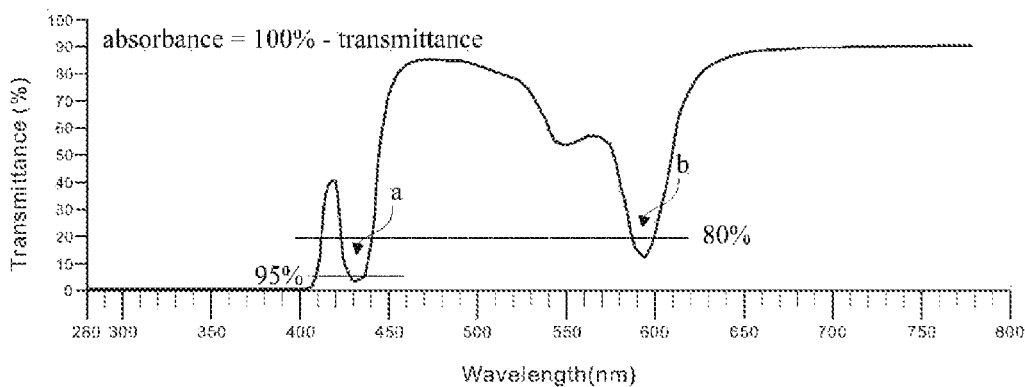
FIG. 5 is a chart illustrating a third filtered spectral band of the optical lens device in accordance with another preferred embodiment of the present invention.

FIG. 5 shows a chart illustrating a third filtered spectral band of the optical lens device in accordance with another preferred embodiment of the present invention. Turning now to FIGS. 1, 2 and 5, by way of example, the optical absorbance portion 2 of the third filtered spectral band has a first main absorbance area "a", as best shown at left side in FIG. 5, and a second main absorbance area "b", as best shown at right side in FIG. 5. Furthermore, the first absorbance peak portion of the first main absorbance area "a" has a first absorbance above 95% and the second absorbance peak portion of the second main absorbance area "b" has a second absorbance above 80%.

Figure 6:
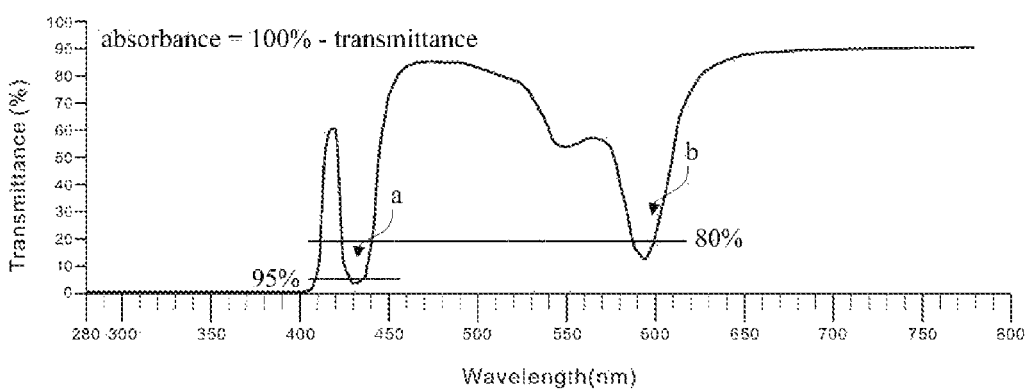
FIG. 6 is a chart illustrating a fourth filtered spectral band of the optical lens device in accordance with another preferred embodiment of the present invention.

FIG. 6 shows a chart illustrating a fourth filtered spectral band of the optical lens device in accordance with another preferred embodiment of the present invention. Turning now to FIGS. 1, 2 and 6, by way of example, the optical absorbance portion 2 of the fourth filtered spectral band has a first main absorbance area "a", as best shown at left side in FIG. 6, and a second main absorbance area "b", as best shown at right side in FIG. 6. Furthermore, the first absorbance peak portion of the first main absorbance area "a" has a first absorbance above 95% and the second absorbance peak portion of the second main absorbance area "b" has a second absorbance above 80%.

Figure 7:
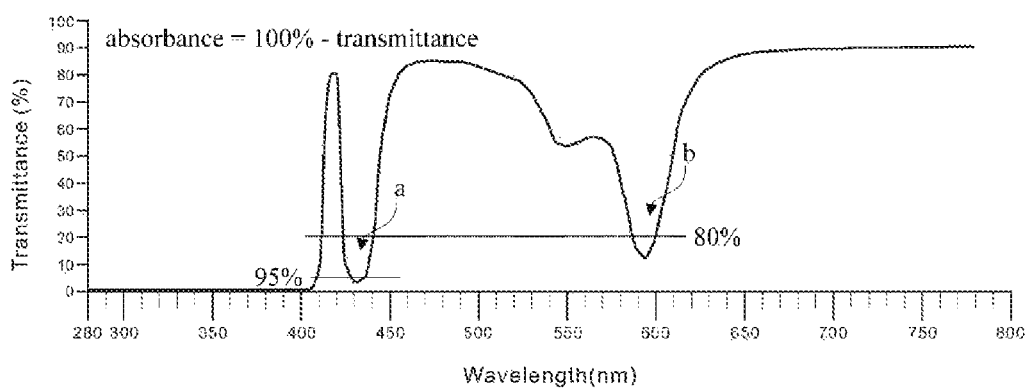
FIG. 7 is a chart illustrating a fifth filtered spectral band of the optical lens device in accordance with another preferred embodiment of the present invention.

FIG. 7 shows a chart illustrating a fifth filtered spectral band of the optical lens device in accordance with another preferred embodiment of the present invention. Turning now to FIGS. 1, 2 and 7, by way of example, the optical absorbance portion 2 of the fifth filtered spectral band has a first main absorbance area "a", as best shown at left side in FIG. 7, and a second main absorbance area "b", as best shown at right side in FIG. 7. Furthermore, the first absorbance peak portion of the first main absorbance area "a" has a first absorbance above 95% and the second absorbance peak portion of the second main absorbance area "b" has a second absorbance above 80%.

Figure 8:
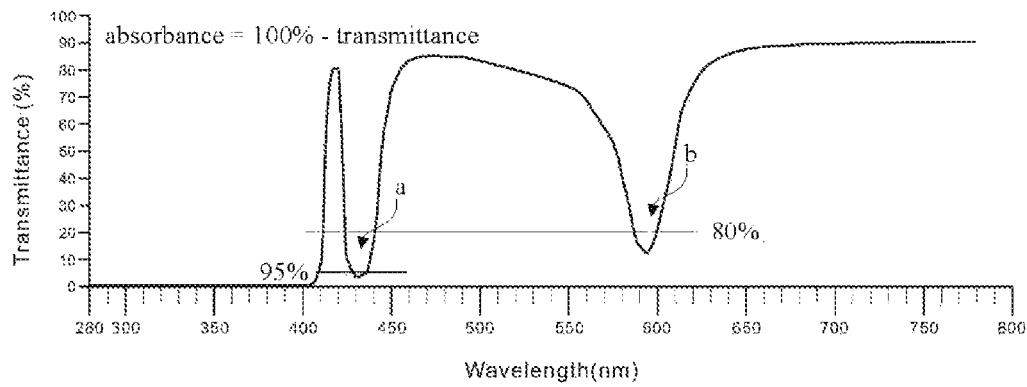
FIG. 8 is a chart illustrating a sixth filtered spectral band of the optical lens device in accordance with another preferred embodiment of the present invention.

FIG. 8 shows a chart illustrating a sixth filtered spectral band of the optical lens device in accordance with another preferred embodiment of the present invention. Turning now to FIGS. 1, 2 and 8, by way of example, the optical absorbance portion 2 of the sixth filtered spectral band has a first main absorbance area "a", as best shown at left side in FIG. 8, and a second main absorbance area "b", as best shown at right side in FIG. 8. Furthermore, the first absorbance peak portion of the first main absorbance area "a" has a first absorbance above 95% and the second absorbance peak portion of the second main absorbance area "b" has a second absorbance above 80%.

Figure 9:
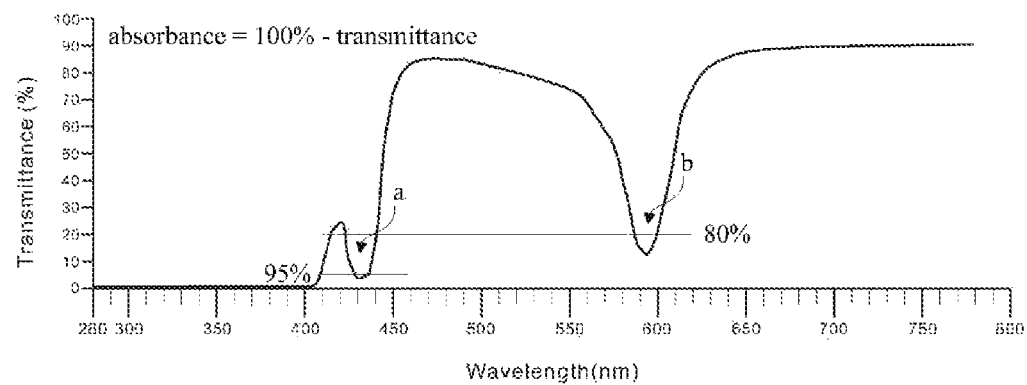
FIG. 9 is a chart illustrating a seventh filtered spectral band of the optical lens device in accordance with another preferred embodiment of the present invention.

FIG. 9 shows a chart illustrating a seventh filtered spectral band of the optical lens device in accordance with another preferred embodiment of the present invention. Turning now to FIGS. 1, 2 and 9, by way of example, the optical absorbance portion 2 of the seventh filtered spectral band has a first main absorbance area "a", as best shown at left side in FIG. 9, and a second main absorbance area "b", as best shown at right side in FIG. 9. Furthermore, the first absorbance peak portion of the first main absorbance area "a" has a first absorbance above 95% and the second absorbance peak portion of the second main absorbance area "b" has a second absorbance above 80%.

Figure 10:
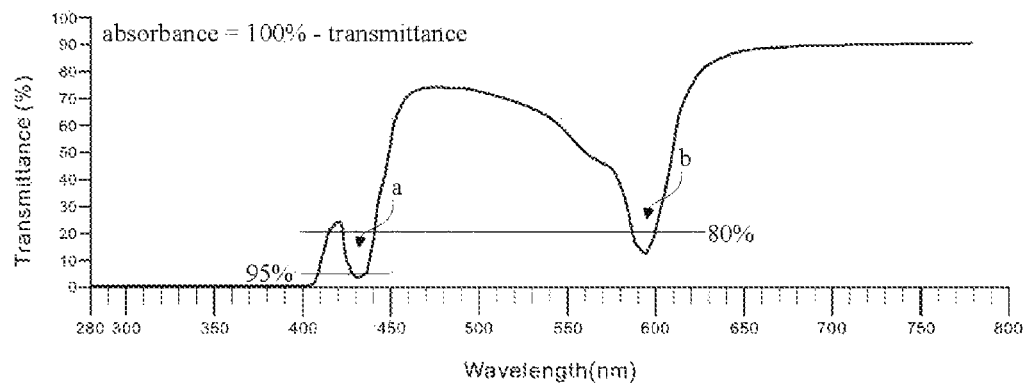
FIG. 10 is a chart illustrating an eighth filtered spectral band of the optical lens device in accordance with another preferred embodiment of the present invention.

FIG. 10 shows a chart illustrating an eighth filtered spectral band of the optical lens device in accordance with another preferred embodiment of the present invention. Turning now to FIGS. 1, 2 and 10, by way of example, the optical absorbance portion 2 of the eighth filtered spectral band has a first main absorbance area "a", as best shown at left side in FIG. 10, and a second main absorbance area "b", as best shown at right side in FIG. 10. Furthermore, the first absorbance peak portion of the first main absorbance area "a" has a first absorbance above 95% and the second absorbance peak portion of the second main absorbance area "b" has a second absorbance above 80%.

Figure 11:
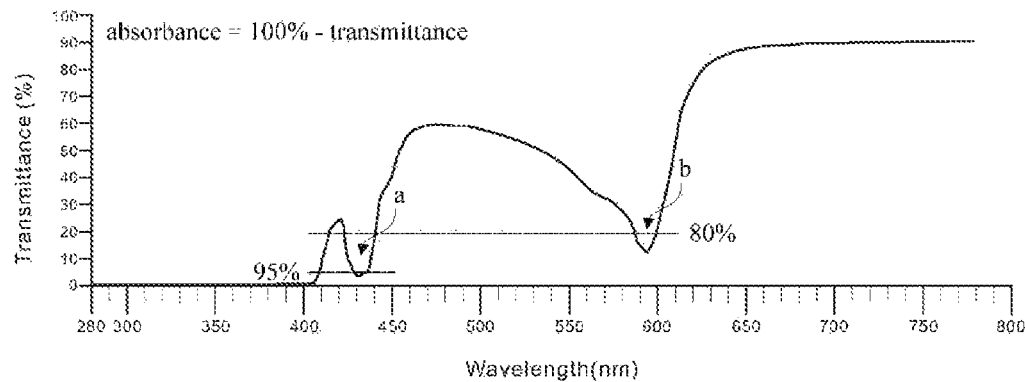
FIG. 11 is a chart illustrating a ninth filtered spectral band of the optical lens device in accordance with another preferred embodiment of the present invention.

FIG. 11 shows a chart illustrating a ninth filtered spectral band of the optical lens device in accordance with another preferred embodiment of the present invention. Turning now to FIGS. 1, 2 and 11, by way of example, the optical absorbance portion 2 of the ninth filtered spectral band has a first main absorbance area "a", as best shown at left side in FIG. 11, and a second main absorbance area "b", as best shown at right side in FIG. 11. Furthermore, the first absorbance peak portion of the first main absorbance area "a" has a first absorbance above 95% and the second absorbance peak portion of the second main absorbance area "b" has a second absorbance above 80%.

Figure 12:
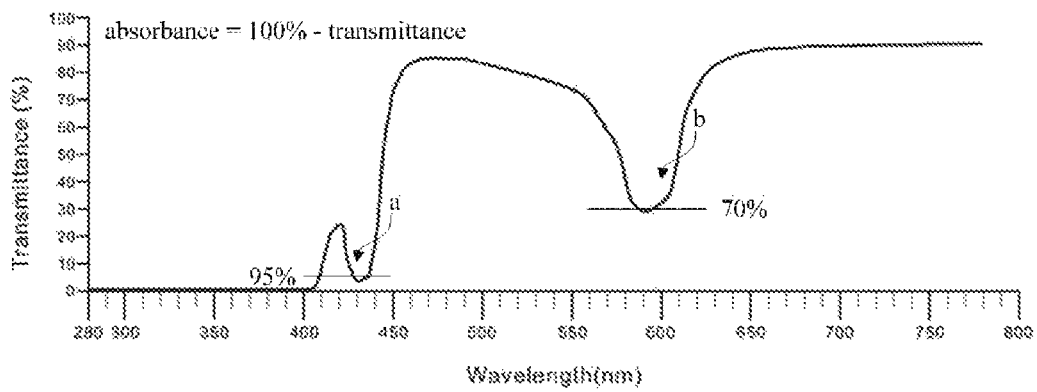
FIG. 12 is a chart illustrating a tenth filtered spectral band of the optical lens device in accordance with another preferred embodiment of the present invention.

FIG. 12 shows a chart illustrating a tenth filtered spectral band of the optical lens device in accordance with another preferred embodiment of the present invention. Turning now to FIGS. 1, 2 and 12, by way of example, the optical absorbance portion 2 of the tenth filtered spectral band has a first main absorbance area "a", as best shown at left side in FIG. 12, and a second main absorbance area "b", as best shown at right side in FIG. 12. Furthermore, the first absorbance peak portion of the first main absorbance area "a" has a first absorbance above 95% and the second absorbance peak portion of the second main absorbance area "b" has a second absorbance above 70%.

Figure 13:
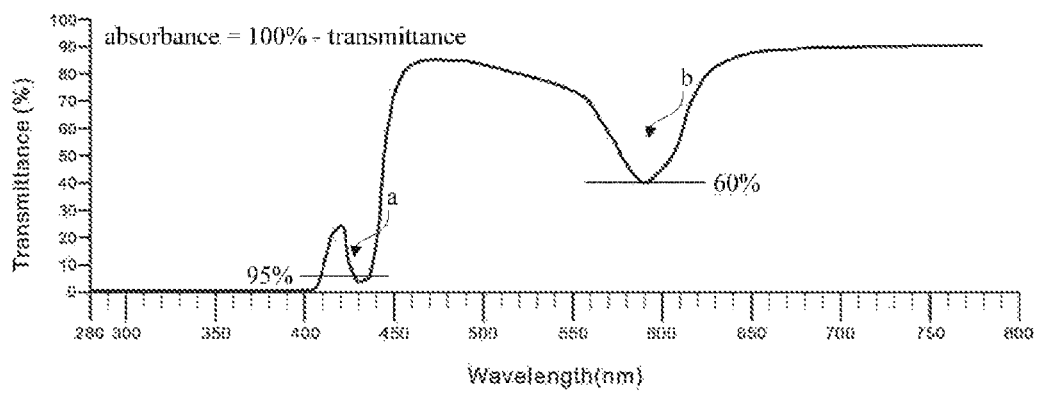
FIG. 13 is a chart illustrating an eleventh filtered spectral band of the optical lens device in accordance with another preferred embodiment of the present invention.

FIG. 13 shows a chart illustrating an eleventh filtered spectral band of the optical lens device in accordance with another preferred embodiment of the present invention. Turning now to FIGS. 1, 2 and 13, by way of example, the optical absorbance portion 2 of the eleventh filtered spectral band has a first main absorbance area "a", as best shown at left side in FIG. 13, and a second main absorbance area "b", as best shown at right side in FIG. 13. Furthermore, the first absorbance peak portion of the first main absorbance area "a" has a first absorbance above 95% and the second absorbance peak portion of the second main absorbance area "b" has a second absorbance above 60%.

Figure 14:
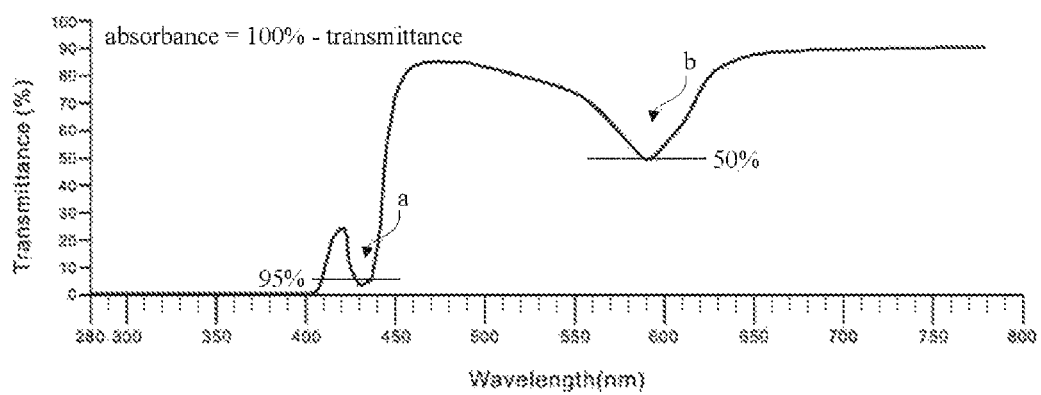
FIG. 14 is a chart illustrating a twelfth filtered spectral band of the optical lens device in accordance with another preferred embodiment of the present invention.

FIG. 14 shows a chart illustrating a twelfth filtered spectral band of the optical lens device in accordance with another preferred embodiment of the present invention. Turning now to FIGS. 1, 2 and 14, by way of example, the optical absorbance portion 2 of the twelfth filtered spectral band has a first main absorbance area "a", as best shown at left side in FIG. 14, and a second main absorbance area "b", as best shown at right side in FIG. 14. Furthermore, the first absorbance peak portion of the first main absorbance area "a" has a first absorbance above 95% and the second absorbance peak portion of the second main absorbance area "b" has a second absorbance above 50%.

Although the invention has been described in detail with reference to its presently preferred embodiment, it will be understood by one of ordinary skills in the art that various modifications can be made without departing from the spirit and the scope of the invention, as set forth in the appended claims.

What is claimed is:

1. An optical lens device comprising:
a lens body having a first lens surface and a second lens surface, with the first lens surface provided at a first side of the lens body, with the second lens surface provided at a second side of the lens body;
an optical filter provided between the first side and the second side of the lens body; and
an optical absorbance portion provided in the optical filter, with the optical absorbance portion having a first main absorbance area with a first absorbance peak portion and a second main absorbance area with a second absorbance peak portion;
wherein the first main absorbance area has a first wavelength range between 420 nm and 440 nm formed as a high-energy blue UV absorbance area, with said first main absorbance area having a first maximum absorbance with a wavelength about 432 nm, while the second main absorbance area has a second wavelength range between 580 nm and 610 nm.

2. The optical lens device as defined in claim 1, wherein the first main absorbance area is formed from a first dye power material.

3. The optical lens device as defined in claim 1, wherein the second absorbance peak portion has a spectral range with a second absorbance above 50%, 60%, 70% or 80%.

4. The optical lens device as defined in claim 1, wherein the first absorbance peak portion has a spectral range with a first absorbance above 80% or 95% or the second main absorbance area has a second maximum absorbance with a wavelength about 595 nm.

5. The optical lens device as defined in claim 1, wherein the first absorbance peak portion has the first wavelength range between 425 nm and 435 nm.

6. The optical lens device as defined in claim 1, wherein the second absorbance peak portion has the second wavelength range between 590 nm and 605 nm or between 590 nm and 600 nm.

7. The optical lens device as defined in claim 1, wherein the optical filter has at least one filter layer formed as a high-energy blue UV absorbance layer and at least one filter layer formed as a yellow-light absorbance layer.

8. An optical lens device comprising:
a lens body having a first lens surface and a second lens surface, with the first lens surface provided at a first side of the lens body, with the second lens surface provided at a second side of the lens body;
an optical filter provided between the first side and the second side of the lens body; and
an optical absorbance portion provided in the optical filter, with the optical absorbance portion having a first main absorbance area with a first absorbance peak portion and a second main absorbance area with a second absorbance peak portion;
wherein the first absorbance peak portion has a first wavelength ranging between 420 nm and 440 nm, with the first main absorbance area formed as a high-energy blue UV absorbance area while the second main absorbance area has a second wavelength range between 580 nm and 610 nm, with said second main absorbance area having a second maximum absorbance with a wavelength about 595 nm.

9. The optical lens device as defined in claim 8, wherein the first main absorbance area has a first maximum absorbance with a wavelength about 432 nm.

10. The optical lens device as defined in claim 8, wherein the first absorbance peak portion has a spectral range with a first absorbance above 80% or 95% or the second absorbance peak portion has a spectral range with a second absorbance above 50%, 60%, 70% or 80%.

11. The optical lens device as defined in claim 8, wherein the second main absorbance area is formed from a second dye powder material.

12. The optical lens device as defined in claim 8, wherein the first absorbance peak portion has the first wavelength range between 425 nm and 435 nm.

13. The optical lens device as defined in claim 8, wherein the second absorbance peak portion has the second wavelength range between 590 nm and 605 nm or between 590 nm and 600 nm.

14. The optical lens device as defined in claim 11, wherein the optical filter has at least one filter layer formed as a high-energy blue UV absorbance layer and at least one filter layer formed as a yellow-light absorbance layer.

15. An optical lens device comprising:
a lens body having a first lens surface and a second lens surface, with the first lens surface provided at a first side of the lens body, with the second lens surface provided at a second side of the lens body;
an optical filter provided between the first side and the second side of the lens body; and
an optical absorbance portion provided in the optical filter, with the optical absorbance portion having a first main absorbance area with a first absorbance peak portion and a second main absorbance area with a second absorbance peak portion;
wherein the first main absorbance area has a first wavelength range between 420 nm and 440 nm formed as a high-energy blue UV absorbance area, with said first main absorbance area having a first maximum absorbance with a wavelength about 432 nm, while the second absorbance peak portion has a second wavelength ranging between 580 nm and 610 nm.

16. The optical lens device as defined in claim 15, wherein the first main absorbance area is formed from a first dye powder material.

17. The optical lens device as defined in claim 15, wherein the second main absorbance area has a second maximum absorbance with a wavelength about 595 nm.

18. The optical lens device as defined in claim 15, wherein the first absorbance peak portion has a spectral range with a first absorbance above 80% or 95% or the second absorbance peak portion has a spectral range with a second absorbance above 50%, 60%, 70% or 80%.

19. The optical lens device as defined in claim 15, wherein the first absorbance peak portion has the first wavelength range between 425 nm and 435 nm.

20. The optical lens device as defined in claim 15, wherein the second absorbance peak portion has the second wavelength range between 590 nm and 605 nm or between 590 nm and 600 nm.

* * * * *